(12) United States Patent
Graceffo et al.

(10) Patent No.: US 10,211,880 B2
(45) Date of Patent: Feb. 19, 2019

(54) RATE LINE SUPPRESSION USING CHAOTIC SPREADING CODES

(71) Applicant: Raytheon Company, Waltham, MA (US)

(72) Inventors: Gary M. Graceffo, Burke, VA (US); Andrew Kowalevicz, Arlington, VA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 15/496,375

(22) Filed: Apr. 25, 2017

(65) Prior Publication Data

US 2017/0317712 A1    Nov. 2, 2017

Related U.S. Application Data

(60) Provisional application No. 62/328,831, filed on Apr. 28, 2016.

(51) Int. Cl.

| H04B 1/707 | (2011.01) |
|---|---|
| H04B 1/713 | (2011.01) |
| H04L 9/00 | (2006.01) |
| H04J 13/00 | (2011.01) |

(52) U.S. Cl.
CPC ............ *H04B 1/707* (2013.01); *H04B 1/713* (2013.01); *H04J 13/0018* (2013.01); *H04L 9/001* (2013.01)

(58) Field of Classification Search
CPC .......... H04B 1/707; H04B 7/216; H04B 1/69; H04J 13/0018; H04J 13/10
See application file for complete search history.

(56) References Cited

U.S. PATENT DOCUMENTS

| 6,259,723 B1 * | 7/2001 | Miyashita | ............ H04B 1/7075 375/141 |
|---|---|---|---|
| 8,351,484 B2 * | 1/2013 | Michaels | ............ H04J 13/0018 375/141 |
| 2012/0106543 A1 * | 5/2012 | King | ........................ H04L 45/22 370/352 |

* cited by examiner

*Primary Examiner* — Vineeta S Panwalkar
(74) *Attorney, Agent, or Firm* — Schwegman Lundberg & Woessner, P.A.

(57) ABSTRACT

A system, method, and computer program product for chaotically generating a pseudorandom number sequence, such as for use in spread spectrum communications systems and in cryptographic systems. Chaotically generated pseudorandom numbers are not cyclostationary in nature, so output values encoded via such non-cyclostationary bases have no clear correlations. Spread signal communications systems using chaotically generated spreading codes thus operate without rate line artifacts, increasing their resistance to signal detection and to determinations of underlying signal chip rates and signal symbol rates. Broadcasts and guided transmissions (including either conductive wire or optical transmission media), in both radio frequency and optical systems are supported. Common spread spectrum communications systems including DSSS and FHSS may be strengthened through the use of chaotically generated spreading codes. Similarly, keys and nonces generated for cryptographic systems may be improved over those based on conventionally generated pseudorandom numbers.

19 Claims, 9 Drawing Sheets

RATE LINE SUPPRESSION USING CHAOTIC SPREADING CODES

CROSS-REFERENCE TO RELATED APPLICATIONS

This application claims priority to provisional U.S. Patent Application No. 62/328,831 filed on Apr. 28, 2016 and entitled RATE LINE SUPPRESSION USING CHAOTIC SPREADING CODES, the disclosure of which is hereby incorporated herein by reference in its entirety.

TECHNICAL FIELD

This document relates to improvements in suppressing rate line artifacts from cyclic code generators, such as may be used in cryptographic and spread spectrum communications systems.

BACKGROUND

Current spread spectrum communications systems have features that are exploitable for detection by unintended recipients. A solution that addresses this issue is needed.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

A traditional pseudorandom number generator produces a sequence of numbers of a given length that statistically approximates a true random number sequence. The length and maximum number of different sequences is generally determined by the number of bits used in the generation methodology. Given a small set of initial values, two identical pseudorandom generators may produce identical random-looking sequences. These combined properties of reproducibility and randomness are very useful in cryptographic and communications systems.

For example, in spread spectrum communications systems, a pseudorandom sequence from a predetermined common generation methodology may control the frequency and/or the content of signals processed both by a transmitter and a separate receiver. Although spread spectrum systems are used for Low Probability of Intercept/Low Probability of Detection (LPI/LPD) communications, they have features that are exploitable for detection by unintended recipients. Specifically, the cyclostationary statistics created by cyclic spreading codes or sequences are detectable using techniques such as delay and multiply. These techniques take advantage of the long-term cyclic nature of such spreading codes to cause artifacts known as rate lines to become discernible, from which the remaining relevant parameters may be extracted to despread the signal.

Transmission of signals in very short burst makes it difficult or impossible to detect rate lines, but this approach adds complexity to the system and reduces the data rate. Filtering can suppress the magnitude of the rate lines generated, but does not eliminate them. Filtering also introduces inter-symbol interference, which causes increased bit-error-rates and increased system complexity. Improved spreading codes to better address the rate line problem are therefore desired.

The present inventors have recognized, among other things, that particular improvements of the apparatus and methods used for generating spreading codes for communications systems are possible and would enable specific distinct advantages.

In an example, a method for performing spread spectrum communications may include establishing common parameters for communications between at least two parties, encoding data bits according to a non-cyclostationary spreading code, and transmitting a signal representing the encoded data bits. The method may further include receiving the transmitted signal, decoding the encoded data bits from the transmitted signal according to a locally generated version of the non-cyclostationary spreading code, and outputting the data bits.

In an example, a computer program product include a non-transitory computer-readable storage medium that stores instructions for execution by at least one processor to perform operations for spread spectrum communications. The operations may configure processing circuitry to establish common parameters for communications between at least two parties, encode data bits according to a non-cyclostationary spreading code, and transmit a signal representing the encoded data bits. The operations may further configure the processing circuitry to receive the transmitted signal, decode the encoded data bits from the transmitted signal according to a locally generated version of the non-cyclostationary spreading code, and output the data bits.

In an example, an apparatus may be configured to perform spread spectrum communications. The apparatus may include a memory and processing circuitry configured to establish common parameters for communications between at least two parties, encode data bits according to a non-cyclostationary spreading code, and transmit a signal representing the encoded data bits. The processing circuitry may further be configured to receive the transmitted signal, decode the encoded data bits from the transmitted signal according to a locally generated version of the non-cyclostationary spreading code, and output the data bits.

In an example, a system for performing spread spectrum communications may include means for establishing common parameters for communications between at least two parties, means for encoding data bits according to a non-cyclostationary spreading code, and means for transmitting a signal representing the encoded data bits. The system may further include means for receiving the transmitted signal, means for decoding the encoded data bits from the transmitted signal according to a locally generated version of the non-cyclostationary spreading code, and means for outputting the data bits.

Unlike traditional cyclic code based pseudorandom number generators, the inventive approach provided in this disclosure generates random numbers according to a chaotic system. The resulting generated numbers may for example control the spreading of a signal in spread signal communications systems as described, without creating rate lines.

For example, in conventional MLS DSSS transmitters, narrowband data is spread using a spreading code comprising $2^n-1$ code "chips", where n is the order of a polynomial used to generate the spreading code. Each data bit to be transmitted is exclusive-ORed (XORed) with the entire spreading code. That is, $2^n-1$ code chips are transmitted for each data bit. If the data bit is a zero, then the spreading code is transmitted, but if the data bit is a one, then the inverse spreading code is transmitted. Since either the spreading code or the inverse spreading code is continually transmitted, there are known techniques that may be used to detect and remove the spreading code from a DSSS transmission.

Figure 1:
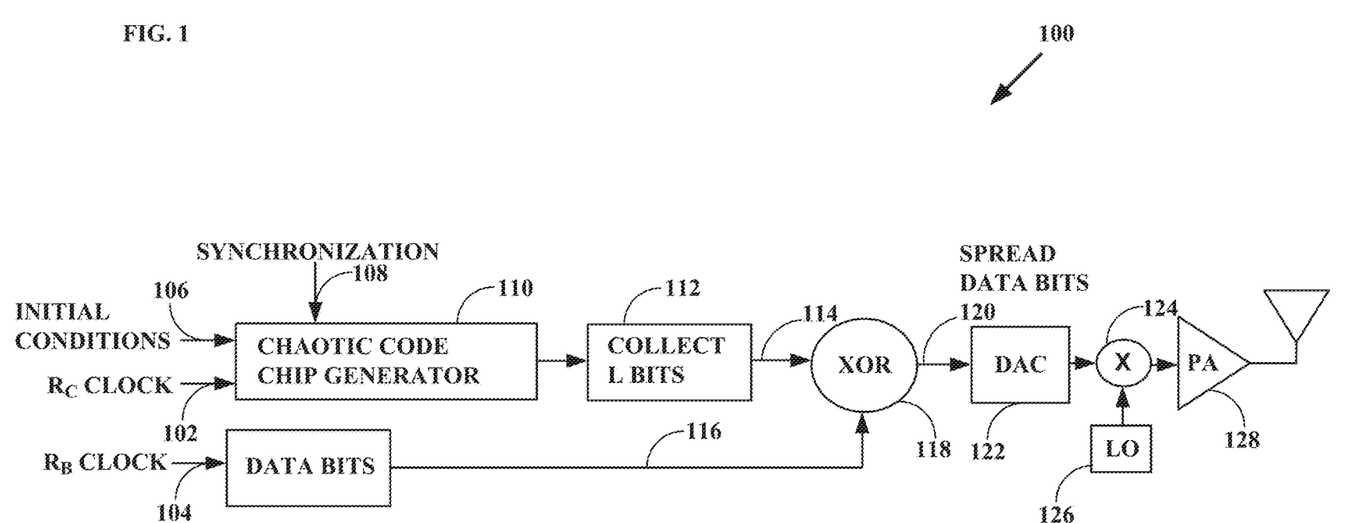
FIG. 1 shows an example of a Direct Sequence Spread Spectrum (DSSS) transmitter system 100 employing a chaotic process to generate chaotic code chips for spreading a narrowband signal.

FIG. 1 shows an example of a DSSS transmitter system 100 employing a chaotic process to generate the chaotic code chips for spreading the narrowband signal. The parties communicating may agree in advance on the code length L. L may be 127 for example, though this disclosure is not limited in this regard.

The spread spectrum transmitter system 100 provided may use two clocks 102 and 104, a set of initial conditions 106, and synchronization signal 108. The chip clock rate, $R_c$ 102 may be defined as having a frequency that is L times the data clock rate, $R_B$ 104. The initial conditions 106 may be specific conditions that are agreed upon by the communicating parties prior to the start of communications. Synchronization via synchronization signal 108 may be performed using any known synchronization technique.

In one example, the chaotic chips may be generated by a chaotic code chip generator circuit 110 that implements the equations describing the gyrations of a double rod pendulum system as the basis for its generated outputs. Other known chaotic evolution functions or "maps" may also be used for this purpose, such as the Lorenz attractor. Multiple such functions may be used together in a given generator circuit.

Chaotic systems are deterministic, but are so highly sensitive to initial conditions that long-term accurate prediction of their future states is very difficult. The uncertainty of a projected chaotic trajectory may increase exponentially with time, so a chaotic system may appear to be random in nature to an external observer. Thus, unless initial conditions 106 used by both a transmitter and receiver are matched and synchronized, for a commonly shared chaotic generator function, there is little chance that a chaotically produced spreading sequence will be reproducible.

The generated chaotic code chips may be collected in blocks of length L in a buffer 112 to form a spreading code 114. As with conventional spread spectrum technology, each block may be XORed with a single data bit 116 by XOR logic circuit 118, to produce either the spreading code 114 or the inverse code (depending on the value of a particular data bit 116) as a chipped data sequence 120. One difference between the approach provided and that of conventional spread spectrum system is that the spreading code 114 used for spreading the data bits 116 is unique for each data bit 116; ergo, there are no cyclostationary statistics. Therefore, there is no means of detection using rate line techniques.

Following the generation of the chipped data sequence 120, the baseband digital signal may be converted to analog by a Digital-to-Analog Converter (DAC) circuit 122, upconverted to the transmit frequency by a mixer circuit 124 and a Local Oscillator (LO) circuit 126, and then amplified by a Power Amplifier (PA) circuit 128 for transmission.

The resulting transmitted signal may comprise a radio frequency electromagnetic signal or an optical signal for example. The transmission may be broadcast "over-the-air" or may be guided, such as via electric currents in a metallic conductor or as light pulses in an optical fiber system. In any case, the transmitted signal will be more resistant to signal detection, including via detection schemes that rely on the cyclostationary nature of conventional spread spectrum systems. Unintended recipients who manage to detect a signal will thus not be able to determine the underlying symbol rate nor the underlying code chip rate from even long-term signal analysis, nor the original data.

Figure 2:
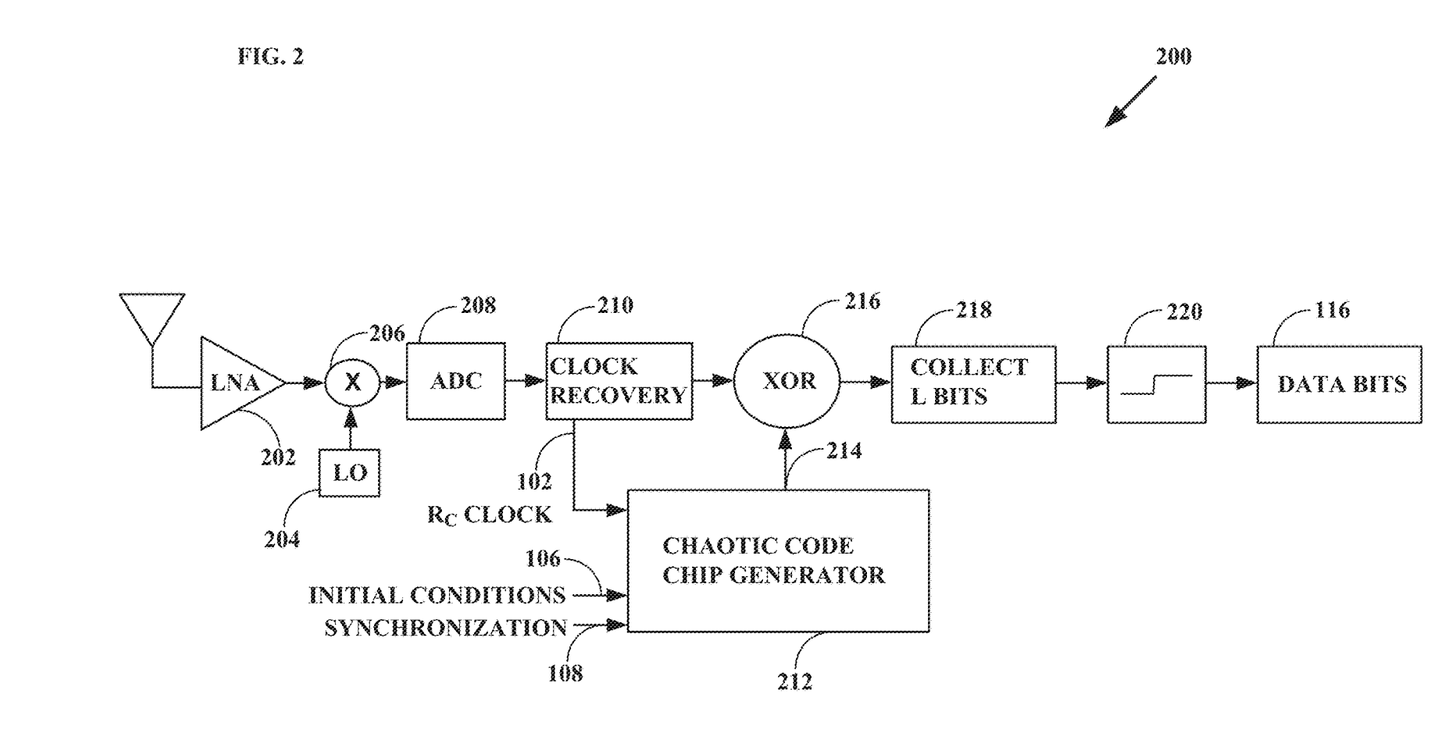
FIG. 2 shows an example of a DSSS receiver system 200 employing a chaotic process for signal reconstruction.

FIG. 2 shows an example of a DSSS receiver system 200 employing a chaotic process for signal reconstruction. Starting from the left side of the figure, the received signal may be amplified by a Low Noise Amplifier (LNA) circuit 202, downconverted to baseband by another Local Oscillator (LO) circuit 204 and another mixer circuit 206, and digitized by an Analog-to-Digital Converter (ADC) circuit 208. A clock recovery circuit 210 may reproduce the chip clock rate 102 and provide it to a receiver chaotic code chip generator circuit 212, which may be operationally similar to the chaotic code chip generator circuit 110 used by the transmitter system 100.

Like the chaotic code chip generator circuit 110 used by the transmitter system 100, the receiver chaotic code chip generator circuit 212 may also be provided with the initial conditions 106 and may be synchronized. As a result, the locally generated chaotic chip sequence 214 may be identical to the spreading sequence produced by the chaotic code chip generator circuit 110 used by the transmitter system 100.

The baseband signal may then be XORed by logic circuitry 216 with the locally generated chaotic chip sequence 214. The XORed chips may be collected together in a receiver buffer 218, and the original data bits 116 may thereby be recovered at 220 and output.

Figure 3:
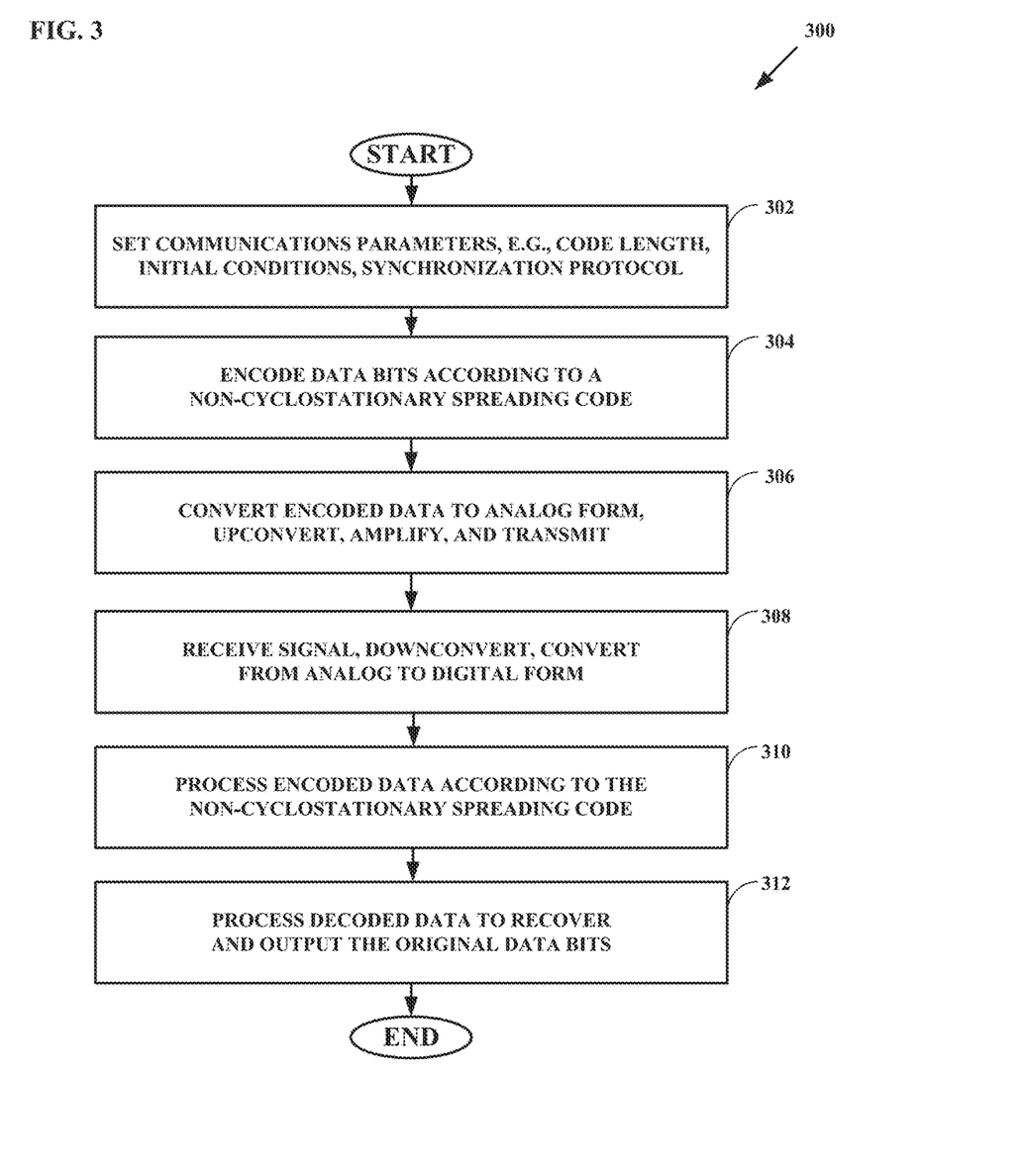
FIG. 3 shows an example of a chaotic spreading code based communications method 300.

FIG. 3 shows an example of a spreading code based communications method 300. This approach may be implemented by a processor circuit executing instructions stored in a memory circuit, such as in so-called software defined radio systems. At 302, a sender and a receiver may agree on communications parameters, such as the code length L, the initial conditions to be provided to chaotic code chip generator circuits, and synchronization protocols. At 304, a sender may encode data bits by XORing each of them with the bits of a non-cyclostationary spreading code, such as may be created by a chaotic code chip generator provided with particular initial conditions. At 306, the encoded data bits may be converted from digital to analog, upconverted to a transmission frequency via mixing with a local oscillator signal, amplified by a power amplifier and transmitted. At 308, a receiver may amplify a received signal, downconvert it via mixing with a local oscillator signal, and convert it from analog to digital. At 310, the received signal may be XORed with the bits of a non-cyclostationary spreading code, such as may be created by a chaotic code chip generator provided with the particular initial conditions used by the sender. At 312, the decoded block may be processed to recover the originally sent data bits.

Figure 4:
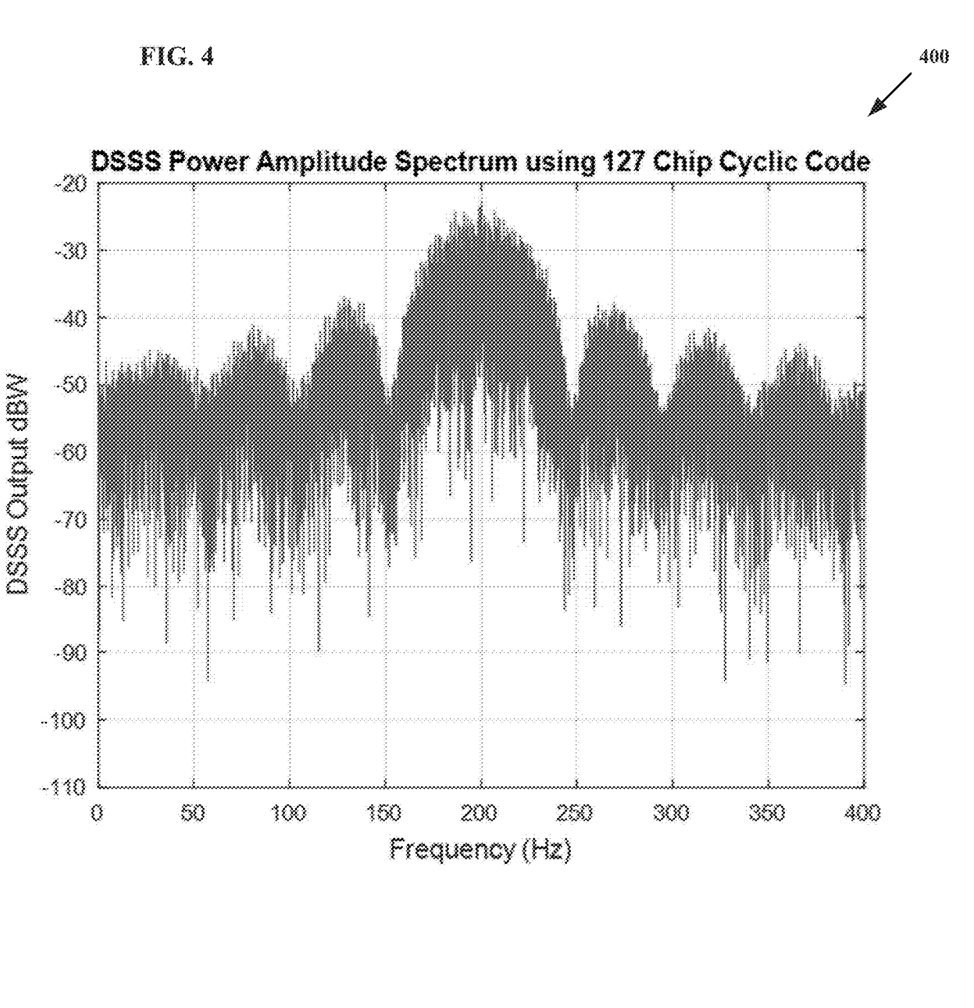
FIG. 4 shows an example of a conventional Maximal Length Sequence (MLS) spread spectrum signal 300 in terms of power versus frequency.
Figure 5:
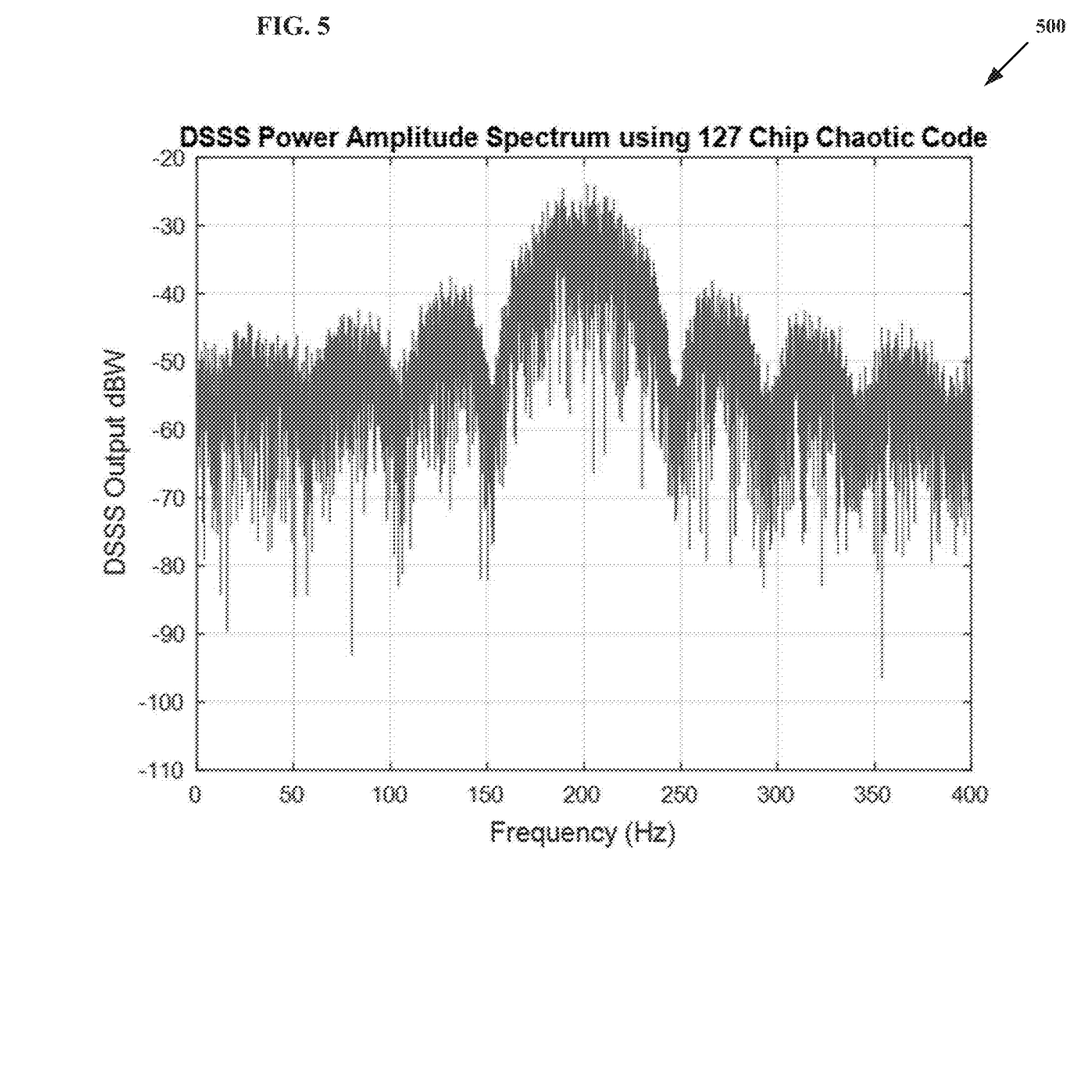
FIG. 5 shows an example of a chaotic spread spectrum signal 500 in terms of power versus frequency.

FIG. 4 shows an example of a conventional MLS spread spectrum signal 300 in terms of power versus frequency. Both FIG. 4 and subsequent FIG. 5 are greatly amplified as compared to operational power levels for clarity. Typically, spread spectrum systems have a negative signal-to-noise ratio before they are despread.

FIG. 5 shows an example of a chaotic spread spectrum signal 500, also in terms of power versus frequency. Note that both the conventional signal 400 of FIG. 4 and the chaotic signal 500 of FIG. 5 have the appropriate envelope and bandwidth.

Figure 6:
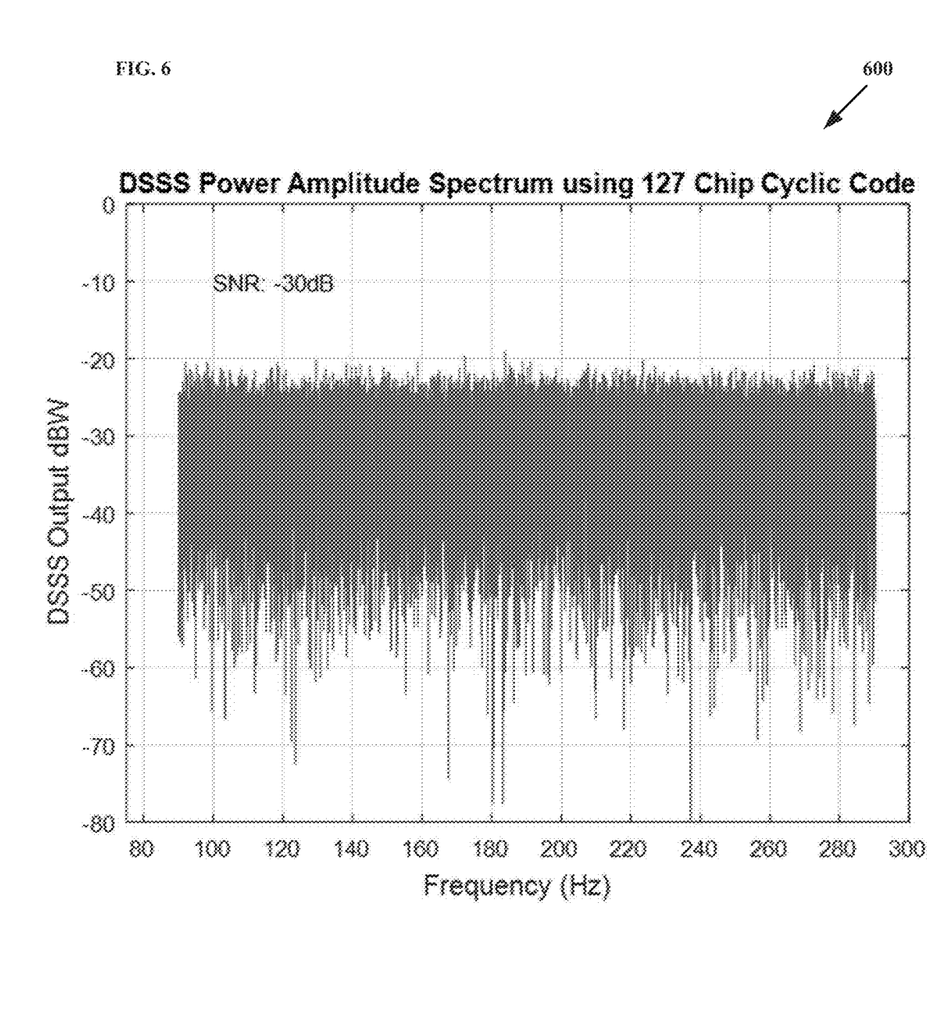
FIG. 6 shows an example of a conventional MLS spread spectrum signal 600.

FIG. 6 shows an example of a conventional MLS spread spectrum signal 600. This is the same signal as in FIG. 4, but the signal energy levels are now shown at operational levels.

Figure 7:
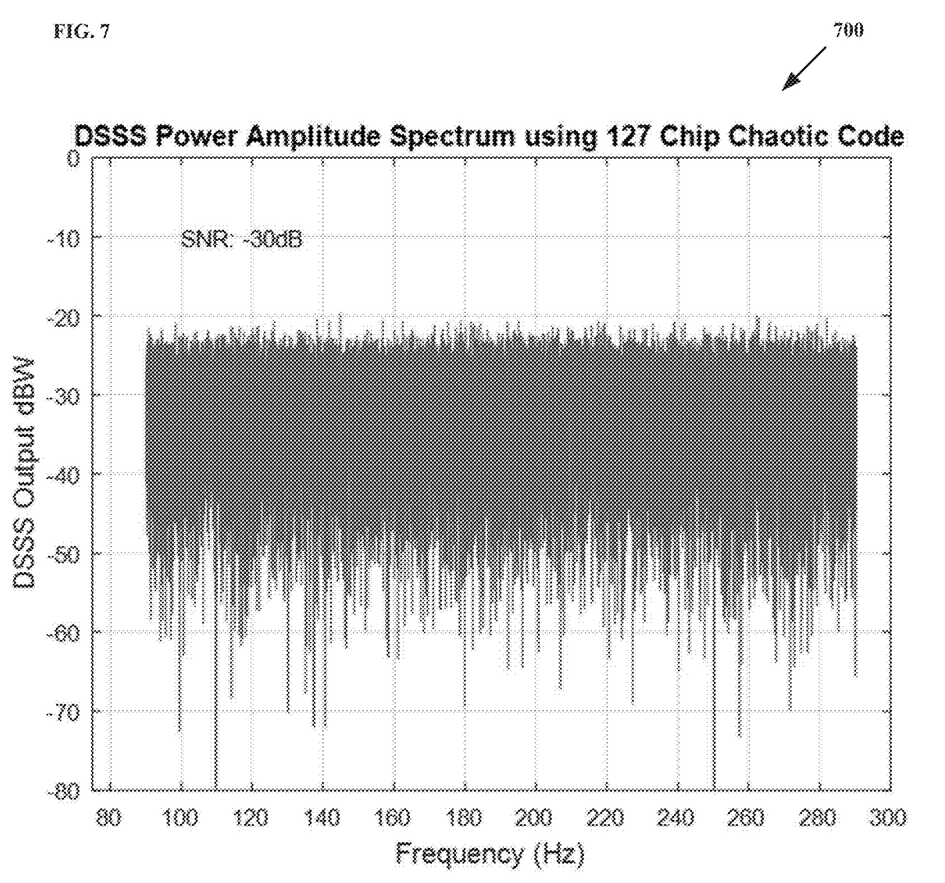
FIG. 7 shows an example of a chaotic spread spectrum signal 700.

FIG. 7 shows an example of a chaotic spread spectrum signal 700. This is the same signal as in FIG. 5, but again the signal energy levels are shown at operational levels. Both signals shown in FIG. 6 and FIG. 7 hide in the noise well. FIGS. 4-7 show that whether a conventional spread spectrum signal or a chaotic spread spectrum signal is used, the output results are not markedly different in apparent character.

Figure 8:
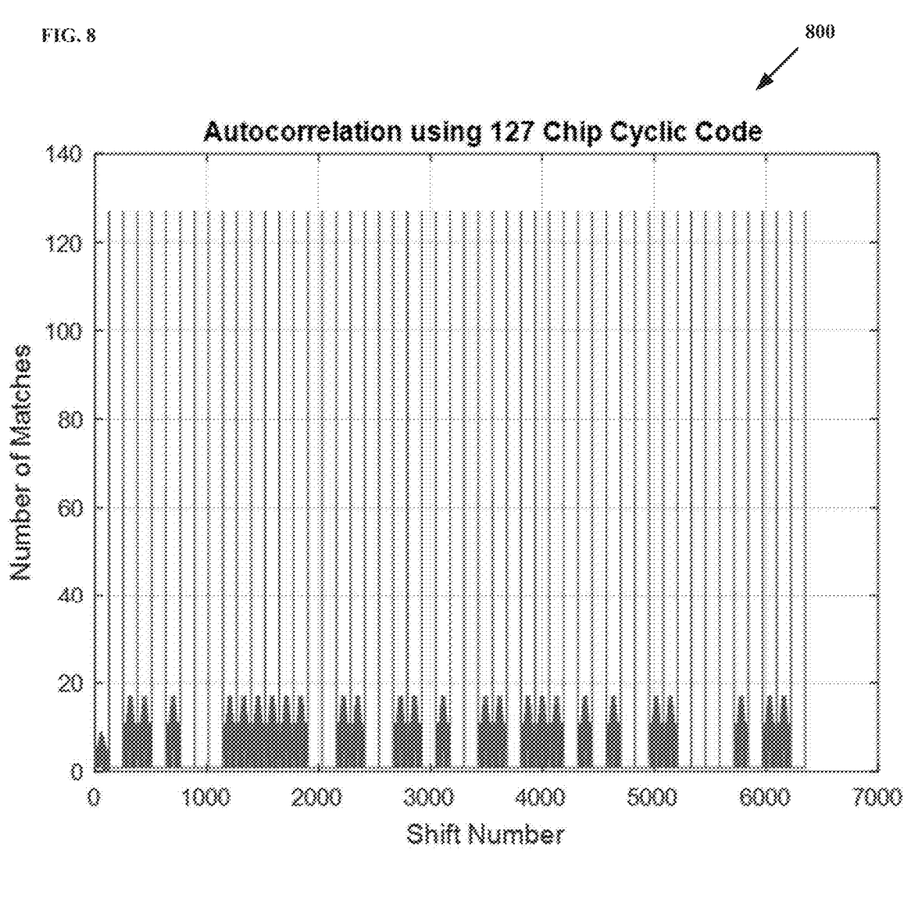
FIG. 8 shows an example of a result 800 of correlating a MLS sequence with the 127-chip-long spreading code used to create the signal.

FIG. 8 shows an example of a result 800 of correlating a MLS sequence with the 127-chip-long spreading code used to create the signal. The absolute value of the correlation scores are plotted as a function of shift position. FIG. 8 clearly shows the rate line artifacts due to the cyclic MLS structure. That is, although the transmitted signal previously shown may appear to be essentially random noise, upon correlation with the governing spreading code its cyclostationary nature becomes evident.

Figure 9:
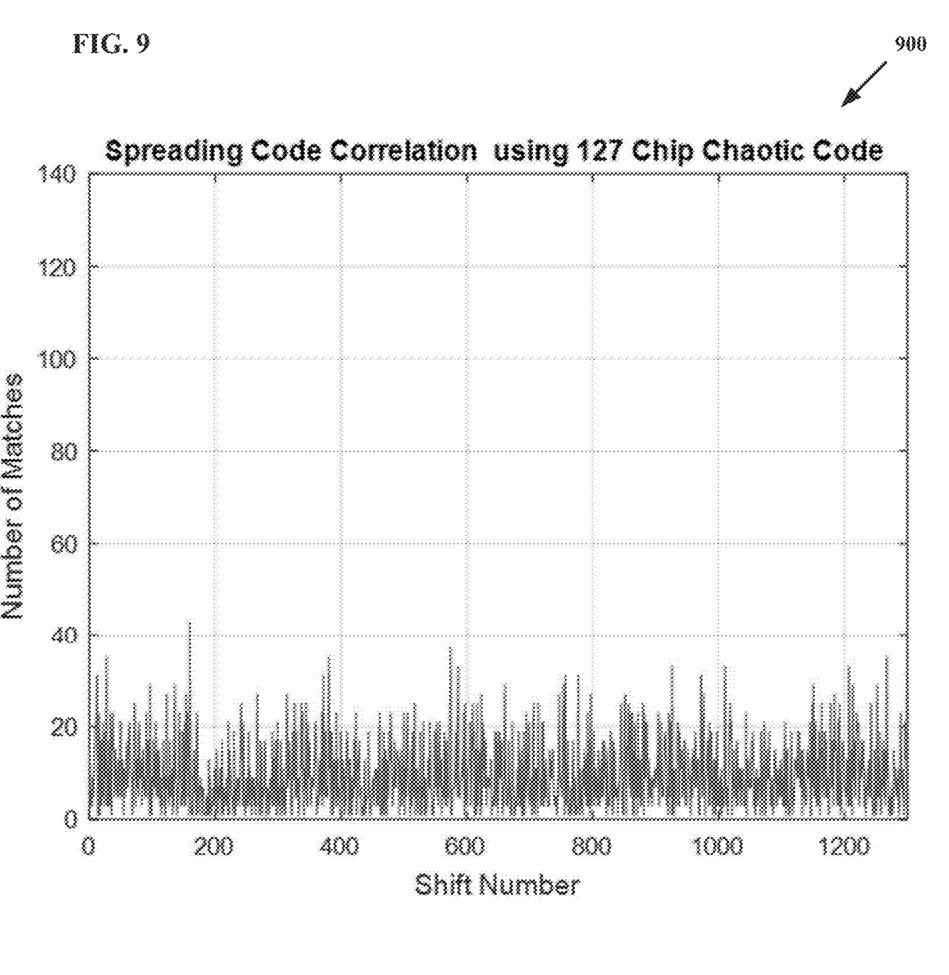
FIG. 9 shows an example of a result 900 of correlating a chaotic sequence against the first 127 bits of the chaotic sequence.

FIG. 9 shows an example of a result 900 of correlating a chaotic sequence against the first 127 bits of the chaotic sequence. For the chaotic sequence, the first 127 bits were chosen because every 127 bits is a representative spreading sequence, although each sequence is unique. As noted previously, this disclosure is not limited to the exemplary value of 127 bits. In contrast to the correlation result of FIG. 8, the FIG. 9 correlation result has no discernable rate lines or exploitable structure. This is because there is no underlying coding structure.

Although described here in terms of a DSSS communications system, a Frequency Hopped Spread Spectrum (FHSS) based communications system may also incorporate the inventive features described. That is, a chaotic pseudorandom number generator circuit may generate a spreading code that determines the sequence of frequencies used for transmission of data in a frequency-hopping spread spectrum system. As with the DSSS based system, both a transmitter and a receiver may use the chaotically generated pseudorandom numbers to spread and despread the transmitted and received signals, respectively.

Further, although described in terms of a spread spectrum communications system, a chaotic pseudorandom number generator circuit may also be advantageous for use with cryptographic systems. For example, cryptographic keys or nonces generated by conventional pseudorandom number generators may be weaker than desired due to their cyclostationary nature. Replacement of a conventional pseudorandom number generator by a chaotic pseudorandom number generator circuit may eliminate any correlations in the generated pseudorandom numbers used for key and nonce generation, and thus stop out certain cryptographic attacks.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. An apparatus configured to perform spread spectrum communications, the apparatus comprising:
a memory; and
processing circuitry configured to:
establish common parameters for communications with a receiver;
generate chaotic chips based on the common parameters;
store the chaotic chips in the memory;
for each data bit in multiple data bits:
generate a non-cyclostationary spreading code from the chaotic chips, the non-cyclostationary spreading code being unique to a data bit; and
encode the data hit with the non-cyclostationary spreading code; and
transmit a signal representing the encoded data bits to the receiver.

2. The apparatus of claim 1, wherein the chaotic chips and the non-cyclostationary spreading codes are based on a chaotic function, wherein the chaotic chips and the non-cyclostationary spreading codes are generated from a double rod pendulum system and a Lorenz attractor.

3. The apparatus of claim 1, wherein rate line artifacts due to correlation of spreading code values are suppressed.

4. The apparatus of claim 1, wherein the signal representing the encoded data bits is one of a Direct Sequence Spread Spectrum (DSSS) signal and a Frequency Hopping Spread Spectrum (MSS) signal.

5. The apparatus of claim 1, wherein the unique non-cyclostationary spreading codes eliminate cyclostationary statistics such that an unintended recipient cannot detect rate lines, a data clock rate or a chip clock rate from the transmitted signal.

6. The apparatus of claim 1, wherein the common parameters comprise at least one of a spreading code length, a data clock rate, a chip clock rate, initial conditions for the non-cyclostationary spreading code, and a synchronization protocol.

7. The apparatus of claim 1, wherein the transmitted signal is broadcast and guided via one of a conductive wire and an optical fiber, and the transmitted signal is one of a radio frequency electromagnetic signal and an optical signal.

8. A method for performing spread spectrum communications, comprising:
establishing common parameters for communications with a receiver;
generating chaotic chips based on the common parameters;
for each data bit in multiple data bits:
generating a non-cyclostationary spreading code from the chaotic chips, the non-cyclostationary spreading code being unique to a data bit; and
encoding the data bit with the non-cyclostationary spreading code; and
transmitting a signal representing the encoded data bits to the receiver.

9. The method of claim 8, wherein the chaotic chips and the non-cyclostationary spreading codes are based on a chaotic function.

10. The method of claim 8, wherein rate line artifacts due to correlation of spreading code values are suppressed.

11. The method of claim 8, wherein the signal representing the encoded data bits is one of a Direct Sequence Spread Spectrum (DSSS) signal and a Frequency Hopping Spread Spectrum (FHSS) signal.

12. The method of claim 8, wherein the unique non-cyclostationary spreading codes eliminate cyclostationary statistics such that an unintended recipient cannot detect rate lines, a data clock rate or a chip clock rate from the transmitted signal.

13. The method of claim 8, wherein the common parameters comprise at least one of a spreading code length, a data clock rate, a chip clock rate, initial conditions for the non-cyclostationary spreading code, and a synchronization protocol.

14. The method of claim 8, wherein the transmitted signal is broadcast and guided via one of a conductive wire and an optical fiber.

15. The method of claim 8, wherein the transmitted signal is one of a radio frequency electromagnetic signal and an optical signal.

16. A non-transitory computer-readable storage medium that stores instructions for execution by at least one processor to perform operations for spread spectrum communications, the operations to configure processing circuitry to:
establish common parameters for communications with a receiver;
generate chaotic chips based on the common parameters;
for each data bit in multiple data bits:
generate a non-cyclostationary spreading code from the chaotic chips, the non-cyclostationary spreading code being unique to a data bit; and
encode the data bit with the non-cyclostationary spreading code; and
transmit a signal representing the encoded data bits to the receiver.

17. The computer program product of claim 16, wherein the chaotic chips and the non-cyclostationary spreading codes are based on a chaotic function.

18. The computer program product of claim 16, wherein rate line artifacts due to correlation of spreading code values are suppressed.

19. The computer program product of claim 16, wherein the signal representing the encoded data bits is one of a Direct Sequence Spread Spectrum (DSSS) signal and a Frequency Hopping Spread Spectrum (FHSS) signal.

* * * * *

UNITED STATES PATENT AND TRADEMARK OFFICE
CERTIFICATE OF CORRECTION

PATENT NO. : 10,211,880 B2
APPLICATION NO. : 15/496375
DATED : February 19, 2019
INVENTOR(S) : Graceffo et al.

Page 1 of 1

It is certified that error appears in the above-identified patent and that said Letters Patent is hereby corrected as shown below:

In the Claims

In Column 7, Line 41, in Claim 1, delete "hit" and insert --bit-- therefor

In Column 7, Line 55, in Claim 4, delete "(MSS)" and insert --(FHSS)-- therefor

Signed and Sealed this
Eighteenth Day of June, 2019

Andrei Iancu
*Director of the United States Patent and Trademark Office*